Sept. 17, 1968      T. J. GAVEN      3,401,470

EDUCATIONAL APPARATUS

Filed May 4, 1966      5 Sheets-Sheet 1

INVENTOR
THOMAS J. GAVEN

BY George H. Fritzinger

AGENT

Sept. 17, 1968  T. J. GAVEN  3,401,470
EDUCATIONAL APPARATUS
Filed May 4, 1966  5 Sheets-Sheet 5

FIG. 8

INVENTOR
THOMAS J. GAVEN
George H. Fritzinger
BY  AGENT

United States Patent Office 3,401,470
Patented Sept. 17, 1968

3,401,470
EDUCATIONAL APPARATUS
Thomas J. Gaven, Livingston, N.J., assignor to McGraw-Edison Company, Elgin, Ill., a corporation of Delaware
Filed May 4, 1966, Ser. No. 547,489
15 Claims. (Cl. 35—9)

This invention relates to audio visual teaching machines adapted especially for children, and more particularly to such teaching machines wherein the pupil triggers the machine into its successive operations and responses by touching a conductive selector pencil to areas of a cover glass overlying the respective items of information shown to the pupil.

In the present description the phrase "items of information" is utilized to include the respective lower and upper case letters, numbers, signs and symbols which appear on the keys of a typewriter, and also words, phrases, sentences, pictures, etc.

In the present machine, programmed visual information is presented to the pupil and audio information related to the visual information is reproduced by a reproducing machine. The audio information as to each item may be presented either in the form of instructions or questions to be followed by the pupil pointing out the correct visual item or, alternatively, the pupil may be called upon to point out the successive items of information after which the machine will pronounce and/or explain the respective items. In either case, the manual selector pencil is disabled while the reproducing machine is in operation so as to enforce a synchronization of the audio information with the selected visual items. When the reproducing machine has completed a particular audio operation it is automatically stopped and the selector pencil is reactivated to enable the pupil to point out a next item in the programmed material. These procedures have been found to be highly successful in teaching children as from three to five years of age to recognize, pronounce and learn the meaning of the various keyboard characters and of pictures, words and sentences as well as the answers to multiple choice questions, etc.

The broad use in a teaching machine of a selector pencil in the manner herein described is disclosed and claimed in the pending application Ser. No. 487,738 of Richard Kobler, filed Sept. 16, 1965, and entitled, "Educational Apparatus," now Patent No. 3,363,330, dated Jan. 16, 1968.

A special feature of the present invention resides in the use of a cover glass having transparent conductive areas on the top surface thereof prearranged in relation to the spatial disposition of the exhibited items for completing respective control circuits to trigger the machine into its successive operations in response to the pupil touching the conductive selector pencil to the areas of the cover glass overlying the respective items. Such cover glass with prearranged invisible conductive areas provides in conjunction with the manual selector pencil a highly simple and effective control means for triggering a teaching machine of the responsive environmental type into its successive operations.

A further special feature of the present invention resides in providing a responsive environment type of teaching machine with a fixed encoding through use of a stepping relay to enforce a selection of the items in a working line in a given sequence. As will appear, the selection may be on a linear basis wherein the pupil selects the items in succession proceeding along the working line or the selection may be scrambled wherein the items are selected by jumping back and forth along the working line.

A still further feature of the invention resides in providing a coding means utilizing a stepping relay of the self-running type and in providing code marks or spots on the sheet bearing the visual items for stopping the relay. In this way any one or more positions can be skipped in the working line whether the coding is on a linear or scrambled basis to provide a greater flexibility in programming the information to be presented to the pupil.

Objects of the invention are to provide a versatile teaching machine of the responsive environment type which is of a simple and economical design enabling this type of teaching machine to be sold at a much lower cost than has been heretofore possible.

Another object is to provide the exhibitor of such teaching machine with a transparent cover glass having thereon invisible conductive areas for the respective items of information, which are activated in a given sequence to trigger the machine into successive operations when the respective areas are touched by a conductive selector device in said given sequence.

Another object is to code such teaching machine to respond to the items in a given sequence with the use of a stepping relay.

Another object is to code such teaching machine by means of a stepping relay of the self-running type which is stopped at particular items of information only when a respective code mark has been placed on the sheet bearing the items.

Another object is to provide an audio visual teaching machine wherein the cover glass for the exhibitor is provided with invisible conductive surface areas to be contacted by a conductive selector device to trigger the machine into its successive operations, and wherein the sheet bearing the visual items of information is provided with conductive code spots to control a self-operating coding means for activating the conductive areas in a predetermined sequence in which the items are to be selected by the pupil.

These and other objects and features of the invention will be apparent from the following description and the appended claims.

In the description of my invention reference is had to the accompanying drawings, of which.

Figures 1, 1A:
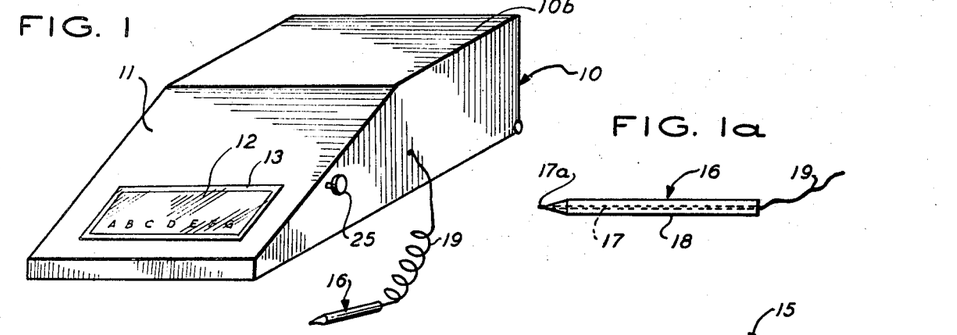
FIGURE 1 is a perspective view of a teaching machine according to the invention.
FIGURE 1a is a view of the manual selector pencil.

The present teaching machine may have a rectangular case 10 provided with a base 10a and a hinged cover 10b. The cover 10b is provided with a sloping front wall 11 having therein a window opening 12 through which a pupil can see the programmed visual material. The window is closed by a transparent cover glass indicated at 13. The programmed material may be written or printed in successive lines 14 on an elongate sheet 15 (FIGURE 3) and may comprise letters, numbers, signs, pictures, words, sentences, etc., representing items of information. Several lines are preferably shown through the window at the same time, of which the bottom line is the working line for the pupil and of which the lines thereabove are those through which the pupil has already advanced. The machine is triggered into successive operations with the use of a manual pencil-like selector device 16 which may be any one of several different forms as far as certain broad features of the invention are concerned. However, the selector device is preferably of a conductive type comprising a control element or wire 17 having thereon an insulating cylindrical holder 18 as of plastic. A tip 17a of the wire 17 is exposed at one end and the other end of the wire is connected via a flexible insulated lead wire 19 to the machine. Alternatively, the manual selector device may be an ordinary lead pencil having a flexible insulated lead wire connected to the head end thereof.

Figure 2:
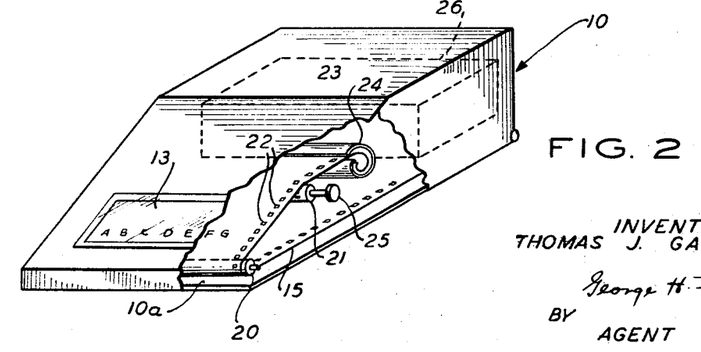
FIGURE 2 is a view similar to FIGURE 1 but with a portion of the cabinet broken away to show the sheet mounting mechanism.

The sheet 15 is fed forwardly across the bottom plate 10a and around a front guide roller 20 in a rearward upward direction across the bottom face of the cover glass 13 by means of a sprocket roller 21 engaging sprocket holes 22 in the side borders of the sheet. At the back of the sprocket roller the sheet is projected through a slot 23 in a tubular container 24 to cause the sheet to curl into a roll form as it is fed thereinto. The sprocket roller 21 may be advanced by a hand knob 25 on a shaft extension thereof or may be operated by power driven mechanism as is herein later described.

In a rearward portion of the case 10 there is a reproducing machine 26 of a suitable quick start-stop type such as a usual dictation-transcribing machine. Also, in this rearward portion of the case there is housed the control circuitry and power supply equipment hereinafter described.

Figure 5:
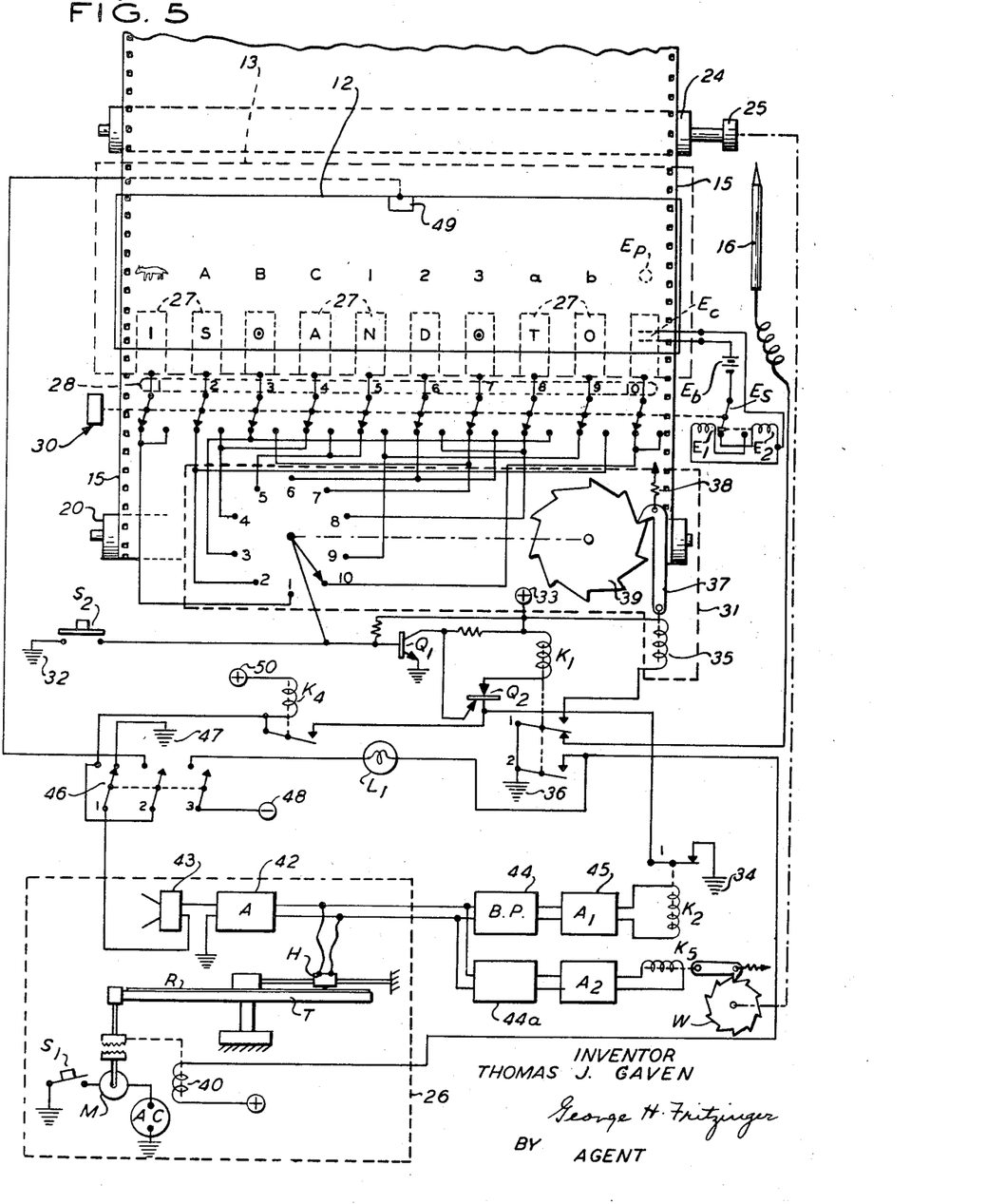
FIGURE 5 is a schematic view of circuits and portions of the operating mechanism according to a first embodiment of the invention.

The cover glass 13 is of the type having a transparent conductive coating of tin oxide on its top surface fired thereon at a high temperature. Such coated glass is sold for example by the Pittsburgh Plate Glass Company of Pittsburgh, Pa., under the trademark "NESA." In the present machine, a cover glass is used having individual areas or segments 27 of such conductive coating overlying the respective items of information in the working line. Such cover glass is prepared by etching away the undesired areas of conductive coating. As shown in FIGURE 5, the glass 13 has ten conductive areas or segments 27 which extend from the bottom edge of the glass into the window area to respective visual items in the working line; however, the tenth area may be a control position for line advance as later described. The conductive segments are connected individually by respective leads of a cable 28 to the poles 29 of a ten-pole double-throw program switch 30. When the switch 30 is in its left position shown in FIGURE 5 the conductive segments are connected progressively from left to right to the successive terminals of a ten position stepping switch 31 hereing employed as a code switch. When the conductive segments 27 are so connected to the code switch the machine is encoded so that the conductive segments 27 will be activated in sequence from left to right on a so-called "linear" basis. When the switch 30 is thrown to its rightward position, the conductive segments 27 are activated successively in a scrambled sequence depending upon the manner in which the poles of the switch are connected to the individual terminals of the stepping relay. As shown in FIGURE 5, the order of successive positions when the switch 30 is in its "scrambled" position, is 1, 4, 7, 5, 9, 8, 6, 3, 2 and 10.

If the machine is operated with the switch 30 in its "linear" position, the record for the reproducing machine 26 is prerecorded with pronunciations, questions and/or explanations pertaining to the visual items as they appear from left to right along the successive lines of the sheet.

Figure 3:
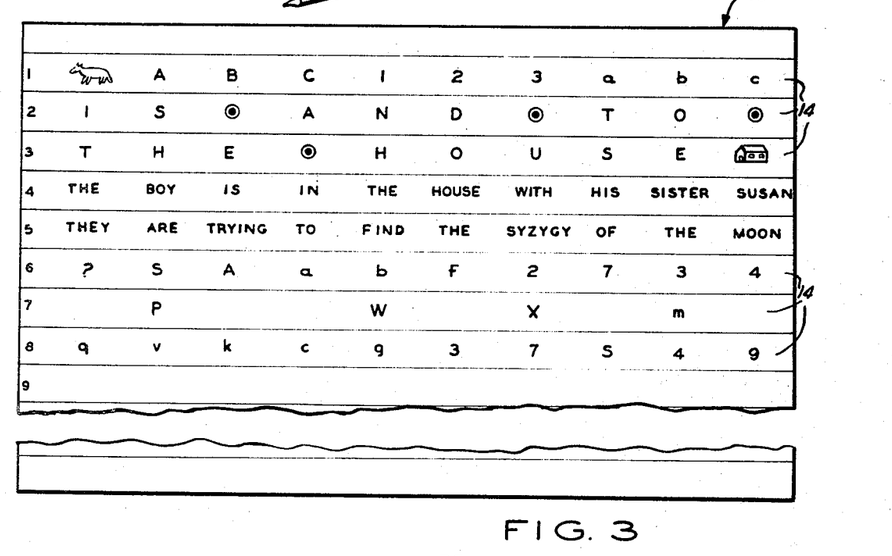
FIGURE 3 shows a sheet of programmed instruction by way of illustrative example.
Figure 4:
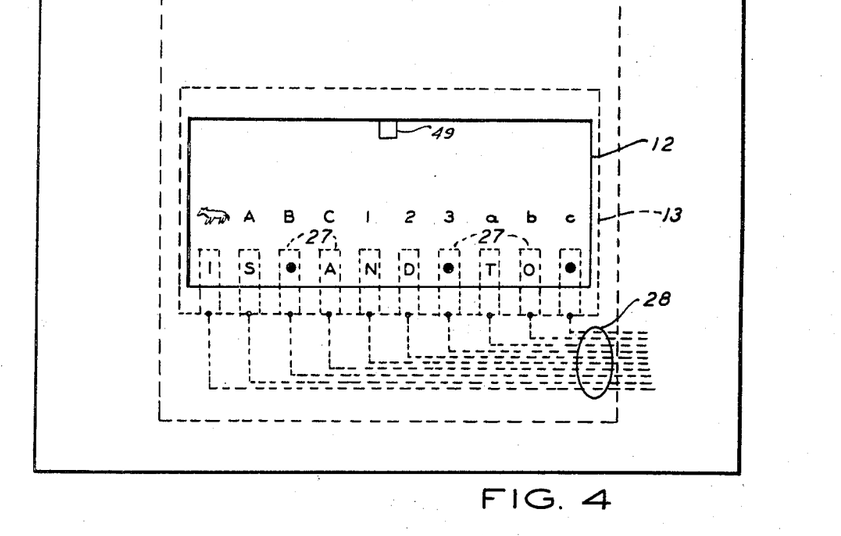
FIGURE 4 is a view through the front window of the teaching machine showing the above sheet of programmed instruction positioned so that line 2 thereof is in the working line position.

If the machine is operated with the switch 30 in its "scrambled" position, then the record is prerecorded to conform to the scrambled sequence in which the visual items are selected by the stepper switch. After making each recording pertaining to a visual item the record is recorded with a short signal of sub-audible frequency, say 50 c.p.s., which is utilized to stop the reproducing machine automatically at the end of each audio message. The operation of the teaching machine is now described with the switch 30 being considered to be in its "linear" position and with the pupil working along line 2 of the sheet 15, as shown in FIGURE 3.

Firstly, the motor switch $S_1$ is closed to start the motor M for the reproducing machine 26 and the start switch $S_2$ is closed momentarily to connect ground 32 to the base of a transistor $Q_1$. The stepper switch 31 will have been standing in position 10 from the previous operation. The momentary grounding of the base of the transistor $Q_1$ cuts off this transistor and causes a positive voltage pulse to be fed to the control element of a silicon controlled rectifier $Q_2$. The rectifier $Q_2$ is thereby rendered conductive until its circuit is interrupted. When the rectifier $Q_2$ becomes conductive the relay $K_1$ is operated from plus terminal 33 through the coil of this relay, rectifier $Q_2$ and pole 1 of relay $K_2$ to ground 34. Operation of the relay $K_1$ shifts its pole 1 from lower to upper contact to remove the ground connection from the manual selector pencil 16 and to connect the terminal 33 through the winding 35 of the stepper relay 31 to ground 36. Activation of the winding 35 draws the pawl 37 downwardly against the resisting force of a tension spring 38 to advance a ratchet 39 by a one-tenth interval whereby to move the stepper switch ahead to position 1. The invisible conductive segment 27 in the number 1 position is therefore connected to the base of transistor $Q_1$ via pole 1 left contact of the switch 30 and the terminal number 1 of the stepping relay 31. The operation of the relay $K_1$ also connects ground 36 through pole 2 to clutch solenoid 40 to start the reproducer 26. The prerecorded message, which is picked up by the reproducer head H from the record R on the turntable T and fed through amplifier 42 to speaker 43, may say "See if you can find the letter 'i'." At the end of this message the reproducer picks up a subaudible 50 c.p.s. control signal which is fed through a band pass filter 44 (having a pass band from 45 to 55 c.p.s.) amplifier 45 and relay $K_2$. The energizing of relay $K_2$ removes ground 34 from relay $K_1$ to drop the latter. The dropping of relay $K_1$ produces the following results: (1) deactivates stepper winding 35 to cause the pawl 37 to be cocked by the spring 38 for a next operation of the stepping relay, (2) restores ground to the manual selector pencil 16, and (3) drops the clutch solenoid 40 at its pole 2 to stop the reproducer.

When the pupil touches the tip of the manual selector pencil 16 to the letter "i," ground 36 is connected through pole 1 of relay $K_1$, pencil 16, first conductive segment 27, pole 1 left contact of switch 30, and first terminal of stepper relay 31 to the base of transistor $Q_1$, causing the transistor to render rectifier $Q_2$ conductive to operate relay $K_1$ from terminal 33 through switch of relay $K_2$ to ground 34. Operation of the relay $K_1$ again activates the stepper winding 35 to advance the stepper relay to position 2 and it activates clutch solenoid 40 of the reproducing machine 26 to restart the reproducer. In this case the reproducer may give the message "Now find the letter 's'." At the end of this message the prerecorded subaudible signal is again reproduced to drop the relay $K_1$. The dropping of the relay $K_1$ again deactivates the stepper winding 35 to cock the pawl 37 for a next operation of the stepping relay, restores ground 36 to the manual selector pencil 16, and stops the reproducer. When the pupil touches the letter "s" the machine goes through another cycle as described above. The teaching machine then awaits the pupil to select the bull's-eye after the letter "s." When the pupil touches the bull's-eye the machine may say "You have spelled the word 'is.' Pronounce it and proceed to the next character." Thus, in this manner the pupil proceeds from left to right one step at a time responding to the audio information called out by the reproducer. Alternatively, the reproducer could give the audio message after the pupil touches each successive segment.

When the pupil has advanced through position 9 the stepper switch 31 will have been advanced to the terminal 10. The attendant may now advance the sheet 15 one line by the knob 25 and again press the start switch $S_2$ to start the pupil at position 1 on the next line the same as above described. Alternatively, the tenth position on the sheet may be marked "line advance" and the record R may be prerecorded with a line advance control signal say at 120 c.p.s. When the pupil after proceeding through the first nine positions of the working line touches the tenth position with the tip of the selector pencil 16, ground 36 is applied to the base of the transistor $Q_1$, the same as before, to step the relay 31 to position 1 and to start the reproducer. The reproducer may say "We will now proceed to the next line. Find the capital letter 'T'." Immediately after this message the reproducer not only picks up the subaudible 50 c.p.s. signal to stop the reproducer but also it picks up the subaudible 120 c.p.s. signal which is fed through a band pass filter 44a (having a pass band from 115 to 125 c.p.s.), amplifier $A_1$ and solenoid $K_5$. The resultant operation of the solenoid $K_5$ advances a ratchet wheel W coupled to the knob 25 to advance the knob by one step and bring line 3 into the working line position.

Since the automatic line advance occurs as a result of a prerecorded line advance signal on the record R, the audio visual material presented to the pupil may be programmed to cause the line advance to occur after a message is given at any position in the working line. Further, the message preceding the line advance may be with reference to an item of information without giving the pupil any advance information as to an automatic advance of the paper sheet to the next line if it is so desired.

In line 3 of the program sheet shown in FIGURE 3 there is spelled the words "THE HOUSE" followed by a picture of a house to teach a child to associate the words with their picture images. Line 4 shows individual words in each successive position to teach a child to read words and sentences.

When a voice switch 46 is thrown to its left position normal ground 47 is removed from the speaker 43 to place the reproducer in a muted condition. The pupil now proceeds along each line touching the cover glass over each character or word as he reads it. No sound is produced because the speaker is disabled but as he touches the cover glass over each successive character or word he is signalled by the lighting of a lamp $L_1$. The lamp is lit from the voltage source 48 through pole 3 of the voice switch 46 and pole 2 of the relay $K_1$ to ground 36. In fact, until he receives the light signal he knows he has not touched the right segment in his progression along each line. If he should come to a word that he cannot pronounce say "syzygy" in position 7 of line 5 he will first touch a mute segment 49 which may be conveniently located in a central upper portion of the window 12. In so doing he connects ground 36 through the selector pencil 16, mute segment 49 and pole 2 of voice switch 46 to relay $K_4$. Relay $K_4$ is then activated from the plus terminal 50 and obtains a hold circuit over its own switch contacts and the switch of relay $K_2$ to ground 34. This ground is also supplied via the same circuit and pole 1 of the voice switch 46 to the speaker 43. Upon then touching the cover glass over the word "syzygy" relay $K_1$ is activated to cause the reproducer to start and pronounce the word in the usual way. At the end of the pronunciation the subaudible signal will actuate the relay $K_2$ to disconnect ground 34 whereby to drop the relay $K_4$ and return the machine to its muted condition.

When the program switch 30 is thrown to the right the sequence of the positions along a working line that the pupil must follow is scrambled as previously stated on page 8. A programming for line 6 of the sheet shown on FIGURE 3, when the program switch 30 is in the scrambled position, may be as follows: When the pupil touches the first conductive segment the reproducer may say "You have touched the question mark, and now I am going to ask you a series of questions. See if you can find the lower case 'a'." When the pupil has found this letter in position 4, the reproducer says, "What number comes after the number 1?" The pupil must now find the number "2" in position 7 before the machine proceeds to the next character, etc. Thus, in the scrambled mode the machine no longer works one segment at a time from left to right but appears to skip segments randomly as well as move from right to left. This is accomplished without programming the sheet other than to arrange the items of information according to the random sequence of the stepper relay.

The sheet may also be programmed so that the program switch 30 will be shifted automatically between linear and scrambled positions as the sheet is advanced from any selected line to the next. Thus, the switch 30 may be an overcenter type actuatable into linear position by an electromagnet $E_1$ and into a scrambled position by electromagnet $E_2$. The electromagnets have a control switch $E_s$. Engaging the bottom side of the sheet is a pair of contacts $E_c$. A source of potential $E_b$ is connectable selectively via the contacts $E_c$ and switch $E_s$ to the electromagnets $E_1$ and $E_2$. When it is desired to shift the program switch 30 from whatever position it is occupying to the other position responsive to a line advance of the sheet, the new line on the sheet is provided with a conductive mark $E_p$ such as a spot of conductive ink which will come into registration with the contacts $E_c$ when the sheet is advanced and cause electrical connection to be made between the contacts. Thus, a spot $E_p$ appearing in line 1 has shifted the program switch 30 from the scrambled to the linear position as follows: When the sheet is placed in the machine to bring the line 1 into the working line position a circuit was completed for the electromagnet $E_1$ via the battery $E_b$, the contacts $E_c$, the electromagnet $E_1$ and the control switch $E_s$ at its right contact. If the attendant wants any subsequent line to be programmed on a scrambled basis a conductive dot $E_p$ will be placed in that line. Such subsequent conductive dot will cause the electromagnet $E_2$ to be activated via the control switch $E_s$ at its left contact. Further, the placement of a conductive spot $E_p$ on any following line would return the programming to a linear basis, etc.

Figure 6:
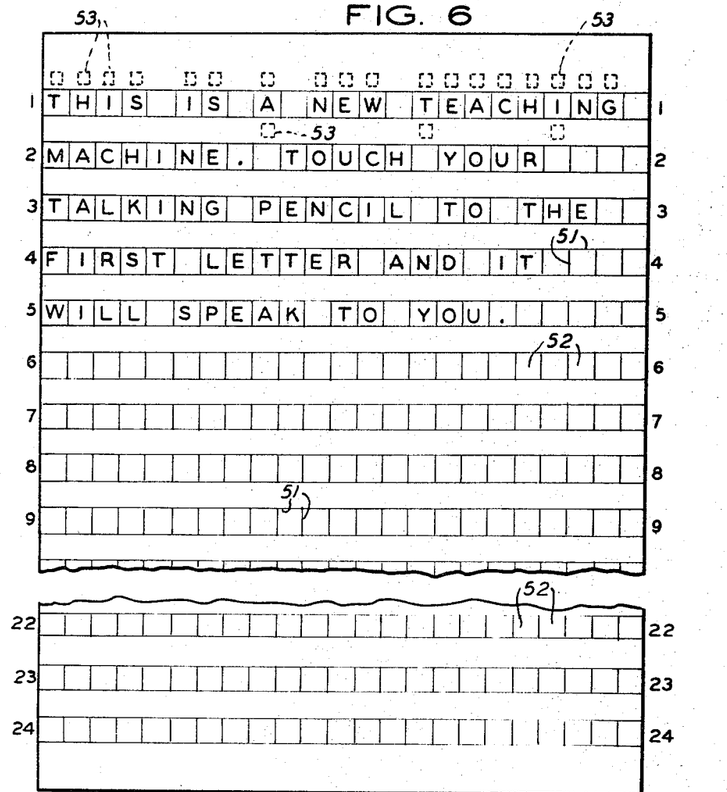
FIGURE 6 shows a sheet of programmed instruction for a second embodiment of my invention wherein the dots in dotted lines indicate conductive code spots on the under side of the sheet.
Figure 7:
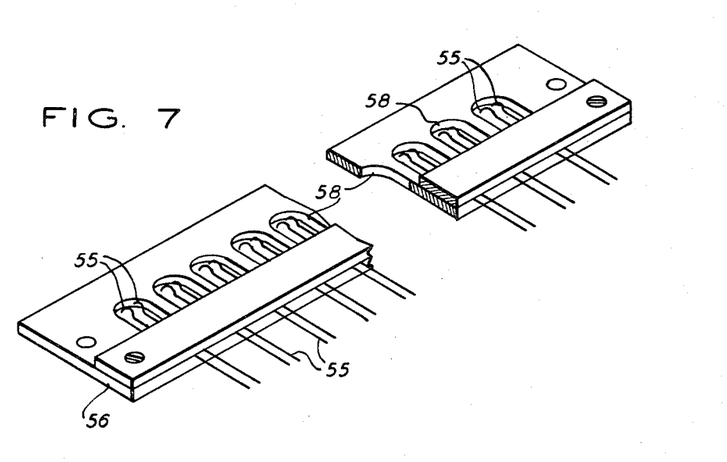
FIGURE 7 is a partial view to enlarge scale of the exhibit window of the second embodiment.
Figure 8:
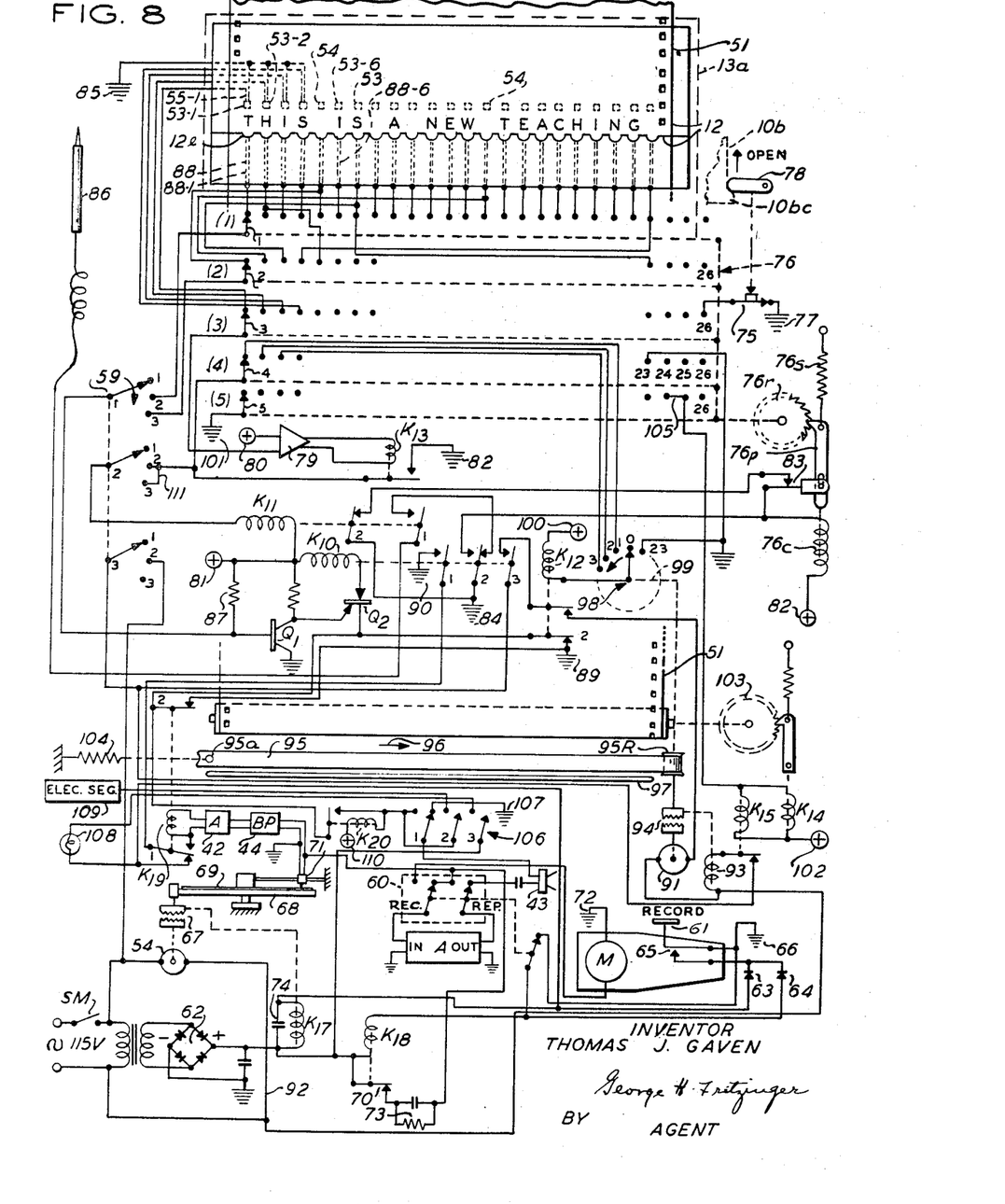
FIGURE 8 is a schematic view of circuits and mechanism according to the second embodiment.

The second embodiment of my invention shown in FIGURES 6 to 8 differs primarily from my first embodiment in that in each line, whether it is programmed on a linear or scrambled basis, any number of positions may be skipped as may be desired. This is accomplished by using a coding means in the form of a self-running stepping relay having a stop circuit for each switch position, and by placing conductive code dots on the teaching sheet for closing the respective stop circuits only at those positions where it is desired to activate the reproducing machine. For instance, if a word was being shown the letters may be in successive positions but a code spot would be placed at the position following the word with the result that the machine would not be activated until the pupil touched the selector pencil to the position at the end of the word. When so activated the machine would spell, pronounce and/or explain the word. This type of coding lends itself also to multiple choice questions and answers since only the correct question and answer would be provided with a code spot to prevent activation of the machine until the correct question or answer had been selected.

FIGURE 6 shows an illustrative program sheet for the second embodiment of my invention. Preferably, the sheet is provided with very fine cross lines 51 to define rectangular areas 52 in which the individual items of information are to be written or printed, there being for example areas for twenty-three items on each line of the sheet. On the back side of the sheet there are placed code dots 53 as of conductive ink to designate the successive positions to be selected by the pupil for audio responses. The code dots are placed preferably between the character lines with each dot representing the respective character directly above it. The back side of the sheet may have very fine cross lines defining small square areas to guide the instructor in placing the code dots when he programs a sheet.

FIGURE 7 shows a pair of spring wire contacts 55 inset in the window 12 for each of the twenty-three code dot positions in a working line. Each code dot 53 of the working line on the program sheet will electrically bridge the respective pair of wire contacts to close a respective stop control circuit for the stepping relay as will appear. When the sheet is advanced to bring a new line in the working line position the code dots 53 of the new line will close another group of stop control circuits, assuming of course that the programming of the next line is different. The wire contacts 55 are held in cantilever fashion between the front border portion of a base plate 56 and a respective clamping bar 57 both made of suitable insulating material. The base plate is provided with respective elongated apertures 58 to clear the upwardly curved free end portions of the wire contacts. The contacts are biased upwardly to engage the under side of the sheet with a light pressure.

In the following detailed description of the operation of the second embodiment of my invention reference is made to the schematic diagram of FIGURE 8. When a program condition switch 59 is in a number 1 or record position the instructor can record an audio program to fit the visual program on the sheet 51. First, he will close a start switch $S_m$ to start the motor 54 and will then throw the record-reproduce switch 60 to its record position. Before beginning the recording operation he will note the visual items in the order in which they are to be taken up in each line on the program sheet, giving careful attention as to whether the sequence is on a linear or scrambled basis and as to the placement of the code dots 53 for each line, and will then record successive pronunciations of characters or words and of explanations, etc., to fit the respective items where the code dots are located. The recording is accomplished by pressing the record start button 61 and then speaking into the microphone M. As the start button 61 is pressed D.C. power is supplied from rectifier 62 to a motor clutch solenoid $K_{17}$ and relay $K_{18}$ through respective diodes 63 and 64 and the record switch 65 to ground 66. The solenoid $K_{17}$ closes the clutch 67 to start the turntable 68 carrying a disk record 69. Operation of the relay $K_{18}$ opens a switch 70 to disconnect the recorded-reproducer head 71 from the rectifier 62, herein utilized as a 120 c.p.s. signal source. The microphone M is connected from ground 72 through pole 1 left contact of the record-reproduce switch 60 to the input of an amplifier A. The output of this amplifier is connected via pole 2 left contact of the record-reproduce switch 60 to the recorder-reproducer head 71. Thus, the voice energy from the microphone is amplified and recorded on the record 69. The instant the attendant release the start button 61 power to the solenoid $K_{17}$ is cut off to disengage the clutch 67 and the relay $K_{18}$ is dropped to connect the 120 c.p.s. signal source through an RC filter 73 to the recorder head 71. The drop out of the solenoid $K_{17}$ is however delayed for a moment by a condenser 74 connected thereacross, with the result that the 120 cycle signal from the rectifier 62 is recorded on the record 69 for a moment before the record is stopped. The recorded 120 c.p.s. signal is utilized to stop automatically the drive of the turntable 68 at the end of the reproduction of each recorded message as is later described.

To place the machine into a teaching condition the instructor shifts the record-reproduce switch 60 to reproduce position which also activates the relay $K_{18}$ so that the 120 c.p.s. signal source will be disconnected permanently from the reproducer head so long as the machine is in the teaching condition. If the programmed material on the sheet 51 is on a linar basis the instructor shifts the condition switch 59 to its number 2 position. At this moment a self-running stepping relay 76 is standing in its far end or number 26 position by reason of a ground 77 being then connected through the pole of deck number 3 of the stepping relay—herein referred to as pole number 3—to activate an electronic switch 79 from a plus terminal 80. When this electronic switch is so activated it causes a relay $K_{13}$ to be also activated from the plus terminal 80. Relay $K_{11}$ was then activated from plus terminal 81 through pole 2 second contact of condition switch 59, and the switch of relay 13 to ground 82. Operation of the relay $K_{11}$ opened its number 2 pole to break the circuit for the stepping relay coil 76c running from plus terminal 82 via stepper switch 83, pole 2 of relay $K_{11}$ and ground 84. The stepping relay is therefore held up in position number 26 in which it stands with the coil 76c being in an inactivated state.

Upon inserting the programmed sheet 51 into the machine and then closing the cover 10b, a switch 75 is opened by the closing of the cover to break momentarily the circuit of the electronic switch 79. The switch 75 is opened momentarily by a cam button 10bc on the cover 10b moving against a press lever 78 operable against the switch. However, as the cover is opened the cam knob 10bc lifts the lever 78 momentarily away from the switch without operating it. The momentary breaking of the circuit of the electronic switch 79 which occurs as the cover is closed causes the relay $K_{13}$ to be dropped momentarily which in turn drops the relay $K_{11}$ to close its number 2 pole switch. The relay $K_{11}$ thus activates the stepping relay coil 76c causing it to draw downwardly or cock the pawl 76p against the force of the spring 76s. In a slight further downward movement of the pawl after it has engaged the next succeeding tooth of a ratchet wheel 76r the stepper switch 83 is opened to release the pawl and cause the ratchet wheel to be advanced one step by the spring 76s. This step advance of the ratchet wheel moves all five decks of the stepping relay through the end of their cycle to their number 1 positions. Since a code dot 53 is located in the number 1 position of the working line a circuit is established immediately from plus terminal 80 through electronic switch 79, pole 3, first contact of stepping relay 76, first wire spring contacts 55-1, first code dot 53-1 and ground 85 to operate the relay $K_{13}$. Operation of the relay $K_{13}$ activates the relay $K_{11}$ to remove ground 84 from the stepping relay coil 76c causing the stepping relay to be advanced to the number 1 position.

The instructor will tell the pupil to touch the selector pencil 86 to the cover glass 13 below the first letter (T) within the area defined by the respective scallop 12e, there being twenty-three such scallops along the bottom edge of the window for the twenty-three possible characters in a working line. On the top surface of the cover glass running from the respective scalloped areas to the bottom edge of the cover glass are respective conductive segments 88 of transparent material as before described. These conductive segments are connected respectively, proceeding from left to right, to the corresponding terminals of deck 1 of the stepping relay 76, this being the linear basis hereinbefore described. The conductive segments are however connected on a scrambled basis to the terminals of deck 2 of the stepping relay 76 as is later further described. Thus, when the pupil touched the selector pencil to the first segment 88-1 a circuit was completed from ground 84 via pole 2 right contact of relay $K_{10}$, pole 1 of relay $K_{11}$, selector pencil 86, conductive segment 88–1, pole 1, first terminal of stepping relay 76, pole 1 second contact of condition switch 59 and resistor 87 to plus terminal 81. The resultant grounding of the base of transistor $Q_1$ turns off the transistor to feed a positive voltage pulse to a silicon controlled diode $Q_2$ rendering it conductive and activating relay $K_{10}$ from plus terminal 81 through pole 2 of relay $K_{12}$ and ground 89. The energizing of relay $K_{10}$ connects ground 90 through pole 1 of this relay, pole 1 lower contact of relay $K_{19}$ and coil of relay $K_{17}$ to plus terminal of rectifier 62. Operation of the relay $K_{17}$ engages the clutch 67 starting the reproducer turntable 68 to cause the reproducer to state the first recorder audio message which may be merely a pronunciation of the letter "T." The shift of pole 2 of relay $K_{10}$ from its right to left contacts removed ground 84 from the manual selector pencil 86 to disable the pencil while the audio message was being given, and connected ground 84 to the stepping relay coil 76c, thereby activating the stepping relay coil to cause it to cock the pawl $76_p$ into engagement with the next tooth of the ratchet $76_r$. This prepares the stepping relay for a next advance when ground 84 is removed from the coil 76c.

The closing of pole 3 of relay $K_{10}$ when this relay was operated connects a 115 volt A.C. source through pole 3 second contact of the condition switch 59, pole 1 of relay $K_{12}$, motor 91 and return line 92. Also, this same voltage source is now connected through pole 3 second contact of the condition switch 59 and the switch of relay $K_{15}$ through clutch solenoid 93 and return line 92 to engage a clutch 94. The resultant operation of motor 91 and engagement of clutch 94 causes a pointer band 95 to be moved in the direction of arrow 96. The pointer band has a light aperture 95a and is positioned between a long fluorescent lamp 97 and the sheet 51. In the home position of the pointer band the light aperture 95a is positioned to the left of the first items in the respective lines on the sheet 51. When the light aperture 95a reaches a position below the first item in the working line, a pointer band switch 98 connected via a mechanical coupling 99 (diagrammatically shown) to the drive roller 95r for the pointer band 95, is moved to its number 1 position. This movement of the pointer band switch 98 to the number 1 position and the concurrent movement of the pole 4 of the stepper switch to the corresponding number 1 position completes a circuit for the relay $K_{12}$ from plus terminal 100 through switch 98 at its first position, pole 4 position 1 of stepping relay 76, switch of relay $K_{13}$—which now stands operated in view of the presence of code dot 53–1—to ground 82. Operation of relay $K_{12}$ removes power at its number 1 pole from the pointer band motor 91 to stop the pointer band with the light aperture below the first item in the working line. When the reproducer has stated the audio message pertaining to the character in the number 1 position, it is stopped by the 120 c.p.s. signal picked up from the record disk 69 the same as in my first embodiment. For instance, the 120 c.p.s. signal activates the relay $K_{19}$ through a band pass filter 44 and amplifier 42. The resultant shift of pole 1 of the relay $K_{19}$ from its lower contact removes ground 90 from the clutch solenoid $K_{17}$ to disengage the clutch 67, and the opening of pole 2 of the relay $K_{19}$ drops the rectifier $Q_2$ back into its nonconductive state—in view of pole 2 of relay $K_{12}$ already standing open—to drop relay $K_{10}$. The resultant shift of pole 2 of relay $K_{10}$ from left to right contacts removes ground 84 from the stepping relay coil 76c allowing the spring 76s to advance the relay to the next position. Since a code dot 53–2 is present in the second position, the relay $K_{13}$ is again activated to activate the relay $K_{11}$ to open its pole number 2 switch and remove power from the stepping coil 76c, leaving the stepping relay stopped in the number 2 position. Not until the pupil touches the second segment 88–2 with the pencil 86 will the relay $K_{10}$ be again activated to cock the pawl of the stepping relay for a next operation and to start the reproducer to give a second audio message. Again, at the end of the audio message the relay $K_{19}$ is operated to drop the relay $K_{10}$ which in turn again activates the stepping relay to move to the next position, etc.

The machine may thus spell the first word "This" letter-by-letter. The audio machine when the pupil touches the last letter "s" may now pronounce the letter "s" followed by pronunciation of the word "This." Following the pronunciation of the word the stepping relay is again activated. This time, there being no code dot in position number 5 after the word "This" the relay $K_{13}$ is not activated as a result of the stepping relay moving through the number 5 position. At the end of the step advance to the number 5 position the closure of the stepper switch 83 provides power immediately to the stepping coil 76c from the plus terminal 82 through pole 2 of relay $K_{11}$ and ground 84 whereby to cock the pawl 76p for a next step advance. When at the end of the stroke the stepper switch 83 is opened thte spring 76s returns the pawl to cause the stepping switch to be advanced to the number 6 position. There being a code spot 53–6 in the number 6 position the relay $K_{13}$ is activated to cause the stepping relay to be again stopped in the manner hereinbefore described.

Although the pointer band is advanced to the position of the stepping relay when the pupil touches the corresponding segment 88 with the selector pencil 86, the pointed band is not advanced step-by-step with the stepping relay when the relay moves continuously through a series of two or more positions before it is stopped. For instance, after the audio message is given responsive to the pupil touching the segment 88–4, the relay $K_{10}$ is dropped to open pole 2 at its left contact to move the stepping relay to the number 5 position. There being no conductive segment in the number 5 position the relays $K_{13}$ and $K_{11}$ are not operated when this position is reached with the result that the stepping relay continues on to the number 6 position. During the movement from position 4 to position 6 the relay $K_{10}$ is never operated and the pointer band motor 91 is standing still, leaving the pointed aperture 95a back in the number 4 position.

When the pupil touches the segment 88–6, the relay $K_{10}$ is operated to supply power via pole 3 thereof and pole 1 of relay $K_{12}$ to the pointer band motor 91 and also via the switch of relay $K_{15}$ to the clutch solenoid 93. As the pointer band is advanced the switch 98 is moved in synchronization therewith. As the switch 98 moves through position 5 the relay $K_{12}$ remains inactivated because the pole member 4 of the stepper relay has been advanced ahead to position 6. However, when the switch 98 reaches position 6 the relay $K_{12}$ is operated via position 6 of the pointer band switch 98, pole 4, position 6 of the stepping relay 76 and the switch of relay $K_{13}$ to ground 82. The operation of the relay $K_{12}$ opens its contact at pole 1 to stop the pointer band motor 91. It does not matter whether the pointer band has reached position 6 before or after the audio message from the reproducer is completed because if the audio message is completed beforehand, the opening of pole 2 of relay $K_{19}$ leaves the relay $K_{10}$ still operated through pole 2 of relay $K_{12}$. When the pointer band switch 98 reaches position 6 the relay $K_{12}$ is operated to drop the relay $K_{10}$ to advance the stepping switch to the next position. This advance of the stepping relay drops the relay $K_{13}$ which in turn drops the relay $K_{12}$.

When the stepping relay 76 is advanced to the end terminal number 24, pole 5 of the stepping relay connects ground 101 to relays $K_{14}$ and $K_{15}$ causing them to be activated from the plus terminal 102. Activation of the relay $K_{14}$ advances the ratchet 103 by one step to advance the sheet 51 to bring the next line in the working line position. Activation of the relay $K_{15}$ opens the circuit of the clutch solenoid 93 disengaging the clutch 94 and enabling the spring 104 to return the pointer band 95 back to home position where the pointer aperture 95a will stand one step to the left of the first character position on the sheet 51. Since the stepping relay advances through positions 24 and 25 without stopping (there being no code spots 53 on the sheet 51 in these positions) the terminals 24 and 25 of the fifth deck are connected by jumper 105 to provide additional time for the sheet to be advanced and the pointer band to be returned.

If the pupil wants to cut off the audio messages to do a so-called silent reading of the programmed material, the voice switch 106 is thrown to the left to remove the normal ground 107 from the speaker 43, as in the first embodiment. This will supply power to a lamp 108 when the relay $K_{10}$ is operated—which is the condition reached when the machine is waiting for the pupil to touch the activated character segment. The lamp 108 is activated from the plus terminal of rectifier 62 via pole 3 of switch 106, pole 1 lower contact of relay $K_{19}$ and pole 1 of relay $K_{10}$ to ground 90. The lamp 108 lights a "voice" segment 109 exposed to the pupil which may be for example located on the cover glass as in the first embodiment. If the pupil wants to hear the next audio message he touches the selector pencil 86 to the voice segment 109 which applies ground through pole 2 of switch 106 to relay $K_{20}$ and through poles 2 and 1 of switch 106 to the speaker 43. The relay $K_{20}$ is operated from plus terminal 110 to apply ground 89 to the relay and speaker until both the relay $K_{19}$ is operated (at the end of the audio message) and relay $K_{12}$ is operated by the stepper relay coming to a position where there is a code dot 54.

When the condition switch 59 is shifted to its number 3 or "program" position, pole number 1 disconnects the first deck of the stepping relay and connects the pole of the second deck to the transistor $Q_1$. The lead line connections of the terminals of deck number 2 to the conductive segments 88 are scrambled so that when the stepper relay is advanced step-by-step the segments will be selected in a predetermined sequence jumping back and forth to different items in the working line according to the particular programming. The deck 3 of the stepping relay again operates the same as before. Deck number 4 is likewise connected the same as before by reason of a jumper 111 between terminals 2 and 3 of pole 2 of condition switch 59. Pole number 3 of the condition switch 59 in moving from position 2 to position 3 disconnects the 115 volt A.C. voltage source so that this source is no longer available either to the pointer band motor 91 or the clutch solenoid 93. This is done so as to disable the pointer band when the teaching machine is conditioned to select the successive items on a scrambled basis.

The embodiments of my invention herein particularly shown and described are intended to be illustrative and not necessarily limitative of my invention since the same are subject to changes and modifications without departure from the scope of my invention, which I endeavor to express according to the following claims.

I claim:
1. In a teaching machine: the combination of a window having a cover glass, means for exhibiting items of information through said window, transparent conductive surface areas on said cover glass predeterminately located relative to the items to be exhibited, a manual selector device of a pencil-like form having a conductive tip and adapted to be held in the hand by the pupil and to be pointed to said respective items in touching contact with said respective conductive areas to select the respective items of information, means in said machine for responding to selection of said successive items, and circuit means including said manual selector device and respective conductive surface areas for causing said responding means to be successively operated as said items are successively selected.

2. The teaching machine set forth in claim 1 wherein said responding means comprises a reproducing machine including a record medium prerecorded with individual messages for pronouncing and/or making statements relating to said successive items, means for starting said reproducing machine responsive to the pupil's selection of said successive items, and means for stopping said reproducing machine automatically at the end of each prerecorded message.

3. The teaching machine set forth in claim 1 wherein said responding means comprises a pointer means successively activatable to indicate said successive items, and means for successively activating said pointer means responsive to the pupil's selection of said successive items.

4. The teaching machine set forth in claim 1 comprising a coding means including a stepping code relay for requiring said items to be selected in a predetermined sequence to produce successive activations of said responding means.

5. The teaching machine set forth in claim 4 including an exhibitor means for presenting successive lines of items of information in a working line position within said window, said cover glass having said conductive surface areas for the respective items in said working line, separate lead line connections from said code switch to said respective surface areas for activating the surface areas in a sequence determined by said line connections, and means to start said responding means when an activated surface area is touched conductively by said manual selector device.

6. The teaching machine set forth in claim 4 including a sheet having successive lines of said items of information thereon, means for shifting said sheet to bring respective lines of said items in a working line position, said cover glass having said individual conductive surface areas only for the respective items in said working line, and wherein said stepping code relay is of the self-running type having a stop circuit for each item in said working line position, said sheet having code marks thereon for each line for closing only selected stop circuits whereby to cause said stepping relay to stop only at selected items in the working line, separate lead line connections between said stepping relay and said conductive surface areas for activating the surface areas corresponding to the positioning of said stepping relay when the relay is stopped, and means operative when an activated surface is touched by said selector device for starting said responding means and for restarting said stepping relay when the responding means is stopped.

7. The teaching machine set forth in claim 6 wherein said code marks are dots of conductive material on the back side of said sheet and wherein said stop circuits have respective pairs of switch contacts engaging said sheet for registration with said respective dots.

8. In a teaching machine: the combination of means for exhibiting items of information at intervals along a given line, a manual pencil-like selector device to be held by the hand of the pupil, a reproducing machine having a record medium bearing successive prerecorded messages to pronounce and/or make statements relating to respective items in said line selected in a prescribed sequence, a coding means including a recycling stepping relay having at least as many switch positions in a cycle as the number of items in said line, means in said machine for advancing said stepping relay by steps as the tip of said selector device is placed at said respective items in said sequence, means controlled by said stepping relay for producing successive activations of said reproducing machine in correspondence with the pupil's selection of said respective items, a sheet bearing said items of information wherein said stepping relay is of the self-running type having a stop circuit for each position of the relay effective when the stop circuit is closed to stop the relay, and wherein said coding means includes a pair of switch contacts in each stop circuit engaging the underside of said sheet, conductive code marks on said sheet only at selected positions where it is desired to close the respective stop circuit, and means to cause the activating means for said reproducing machine to be rendered operative when said stepping relay is stopped and the pupil places the tip of said selector device at the item corresponding to the position in which said relay is stopped.

9. The teaching machine set forth in claim 8 including a pointer means advanceable along the line of items being shown to a pupil, and means operative while said relay is in a stopped condition for advancing said pointer means to the item corresponding to the position in which said relay is stopped when the pupil places the tip of said selector device at said corresponding item.

10. The teaching machine set forth in claim 9 including means controlled by said reproducing machine and said pointer means for restarting said stepping relay only when the pointer means has been advanced to said corresponding item and the audio message from the reproducing machine is completed.

11. In a teaching machine: the combination of a window having a cover glass, means for exhibiting successive lines of items of information through said window in a working area, separate transparent conductive surface areas on the outer surface of said cover glass located in predetermined relation to the items of information within said working area, a manual pencil-like selector device having a conductive tip and a flexible lead line connection to said machine for selecting said respective items by touching the tip of the selector device to the conductive areas associated with said respective items, a code means including a stepping relay for requiring the items in the working area to be selected in a predetermined sequence, and means responsive to selecting a predetermined item within said working area for presenting a new set of items within said area.

12. The teaching machine set forth in claim 11 wherein said stepping relay has a first switch deck connected linearly to said conductive surface areas to require the items in said working area to be selected in a sequence proceeding progressively across said window, wherein said stepping relay includes a second switch deck connected in a scrambled sequence to said conductive surface areas, and a program selector switch for selectively connecting either said first or second switch decks in circuit with said coding means.

13. The teaching machine set forth in claim 11 wherein said respective items are carried on a sheet and the code stepping relay is of the self-running type including a stop circuit for each switch position thereof and respective pairs of switch contacts in said stop circuits positioned in contact with said sheet in registration with said respective items, and conductive code spots on said sheet only at the predetermined items to be selected by the pupil for bridging the pairs of switch contacts and stopping the stepping relay at said predetermined items.

14. The teaching machine set forth in claim 12 including electromagnetic means for operating said program switch, code marks associated with selected ones of said lines, and circuit means controlled according to whether a code mark is associated with a given line as the line is exhibited for operating said program switch.

15. The combination set forth in claim 14 wherein said exhibited items are carried by a sheet, including stepping means for advancing said sheet one line at a time, and wherein said circuit means for operating said electromagnetic means includes a pair of switch contacts engaging said sheet and wherein said code marks are on said sheet for interconnecting said contacts as a preselected line is brought into exhibition by said stepping means for operating said electromagnetic means and shifting the program switch from one position to the other.

References Cited
UNITED STATES PATENTS 3,281,959 11/1966 Kobler et al. _________ 35—9
3,314,166 4/1967 Styes _____________ 35—9

EUGENE R. CAPOZIO, *Primary Examiner.*

W. W. NIELSEN, *Assistant Examiner.*